United States Patent
Matsumoto et al.

(10) Patent No.: US 12,387,504 B2
(45) Date of Patent: Aug. 12, 2025

(54) IMAGE PROCESSING APPARATUS

(71) Applicant: DENSO TEN Limited, Kobe (JP)

(72) Inventors: Yuki Matsumoto, Kobe (JP); Naoshi Kakita, Kobe (JP); Takashi Kono, Kobe (JP); Shota Kinoshita, Kobe (JP); Yasutaka Nishijima, Kobe (JP)

(73) Assignee: DENSO TEN Limited, Kobe (JP)

( * ) Notice: Subject to any disclaimer, the term of this patent is extended or adjusted under 35 U.S.C. 154(b) by 69 days.

(21) Appl. No.: 18/583,975

(22) Filed: Feb. 22, 2024

(65) Prior Publication Data
US 2024/0312224 A1    Sep. 19, 2024

(30) Foreign Application Priority Data

Mar. 15, 2023    (JP) .................................. 2023-040917

(51) Int. Cl.
*G06V 20/58* (2022.01)
*G06T 7/11* (2017.01)

(52) U.S. Cl.
CPC .............. *G06V 20/584* (2022.01); *G06T 7/11* (2017.01)

(58) Field of Classification Search
None
See application file for complete search history.

(56) References Cited

U.S. PATENT DOCUMENTS

| 2015/0186734 | A1* | 7/2015 | Nakagawa | G06V 20/584 382/104 |
| 2017/0228606 | A1* | 8/2017 | Guan | G06T 7/90 |
| 2023/0134330 | A1* | 5/2023 | Horiba | G06T 7/50 382/106 |
| 2024/0208501 | A1* | 6/2024 | Kitahara | B60W 50/14 |
| 2024/0404300 | A1* | 12/2024 | Ikeda | G06V 20/584 |

FOREIGN PATENT DOCUMENTS

JP    2022-108760 A    7/2022

* cited by examiner

*Primary Examiner* — Samira Monshi
(74) *Attorney, Agent, or Firm* — Oliff PLC

(57) ABSTRACT

An image processing apparatus includes a controller configured to: (i) perform image recognition of a camera image to identify a signal region in which a traffic light exists in the camera image, the traffic light including an arrow light; (ii) identify a candidate region of the signal region, the candidate region satisfying (a) a first condition related to a color component of the arrow light and (b) a second condition related to a luminance component of the arrow light; and (iii) determine that the arrow light of the traffic light is turned on when a size of the candidate region that has been identified is smaller than a predetermined size.

13 Claims, 9 Drawing Sheets

IMAGE PROCESSING APPARATUS

BACKGROUND OF THE INVENTION

Field of the Invention

The invention relates to an image processing apparatus, an image processing method and a non-transitory computer-readable recording medium.

Description of the Background Art

Conventionally, in a case where an arrow light of a traffic light is detected from a camera image of a vehicle, a technology that estimates a position of a red light based on the detected arrow light, and when the red light is detected in an estimation position, detects the arrow light as a true arrow light has been proposed (for example, refer to the Japanese Published Unexamined Patent Application No. 2022-108760).

However, when the above conventional technology is used, a position of a pixel that is detected as the red light due to halation at night is deviated so that the arrow light may be undetected although the arrow light is actually turned on.

Furthermore, when the red light of the traffic light without the arrow light is turned on, if there happens to be a background, such as a tree having the same color component as that of the arrow light, in a position of the arrow light in the traffic light with the arrow light, the arrow light may be erroneously detected.

SUMMARY OF THE INVENTION

According to one aspect of the invention, an image processing apparatus includes a controller configured to: (i) perform image recognition of a camera image to identify a signal region in which a traffic light exists in the camera image, the traffic light including an arrow light; (ii) identify a candidate region of the signal region, the candidate region satisfying (a) a first condition related to a color component of the arrow light and (b) a second condition related to a luminance component of the arrow light; and (iii) determine that the arrow light of the traffic light is turned on when a size of the candidate region that has been identified is smaller than a predetermined size.

It is an object of the invention to provide an image processing apparatus, an image processing method and a non-transitory computer-readable recording medium capable of improving a detection accuracy of an arrow light in a traffic light.

These and other objects, features, aspects and advantages of the invention will become more apparent from the following detailed description of the invention when taken in conjunction with the accompanying drawings.

DESCRIPTION OF THE EMBODIMENTS

An embodiment of an image processing apparatus, an image processing method, and a non-transitory computer-readable recording medium disclosed in the present application will be described in detail below with reference to the accompanying drawings. This invention is not limited to the embodiment described below.

In the following, it is assumed that an image processing apparatus 10 according to the embodiment is an in-vehicle apparatus to be mounted in a vehicle. The image processing apparatus 10 is provided to detect an object and a state of the object in a camera image by image recognition of the camera image. In this embodiment, it is assumed that the object to be detected is a traffic light 300. Furthermore, it is assumed that the state of the object to be detected is a lighting state of the traffic light 300.

Hereinafter, the expression "prescribed" or "certain" may be replaced with "predetermined".

Figure 1:
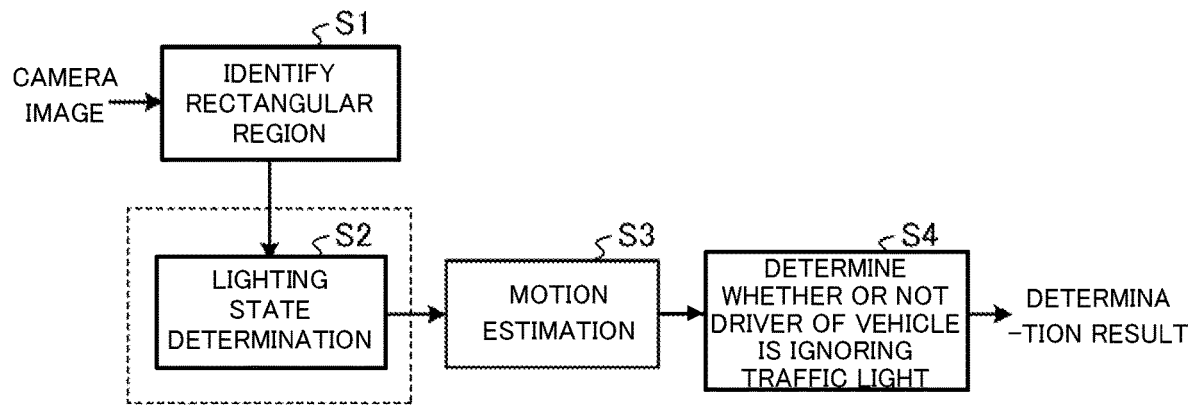
FIG. 1 is a schematic explanatory diagram (No. 1) of an image processing method according to an embodiment.
Figure 2:
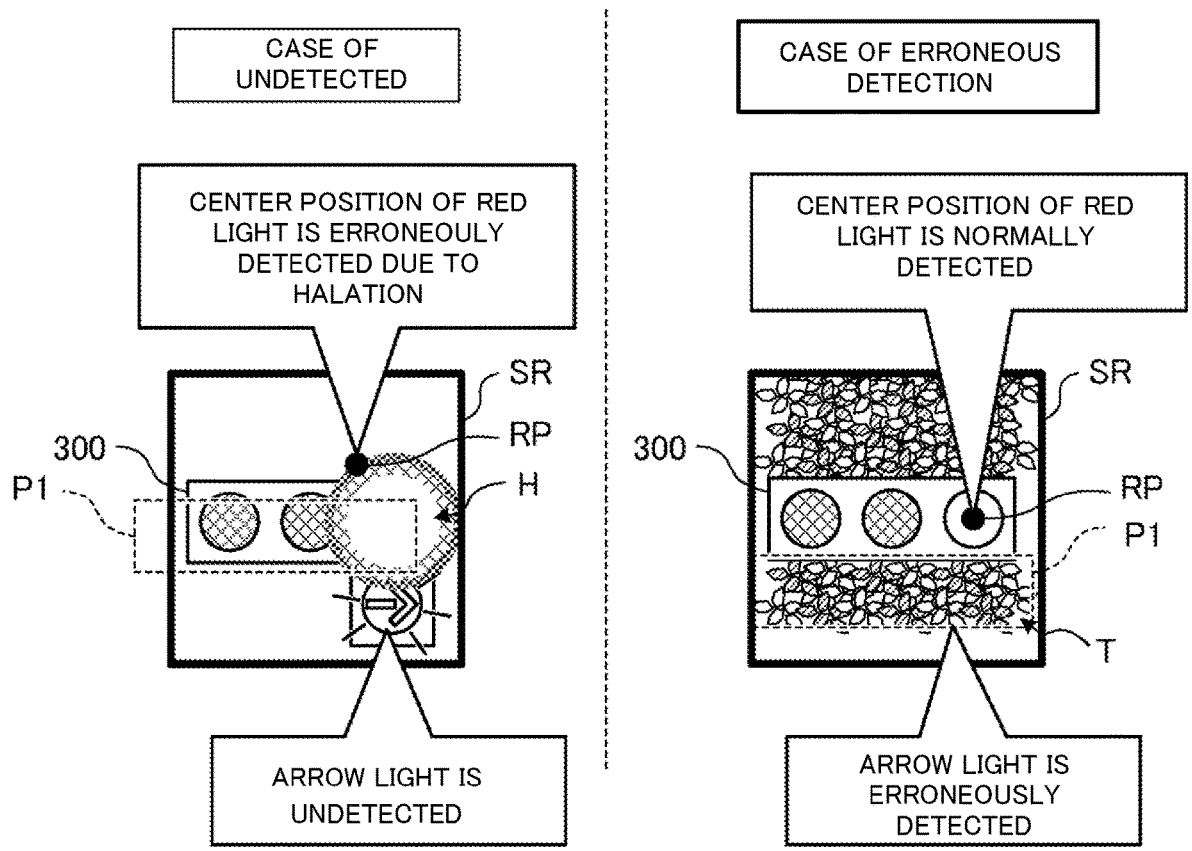
FIG. 2 is an explanatory diagram in a case where a conventional arrow light is undetected or erroneously detected.
Figure 3:
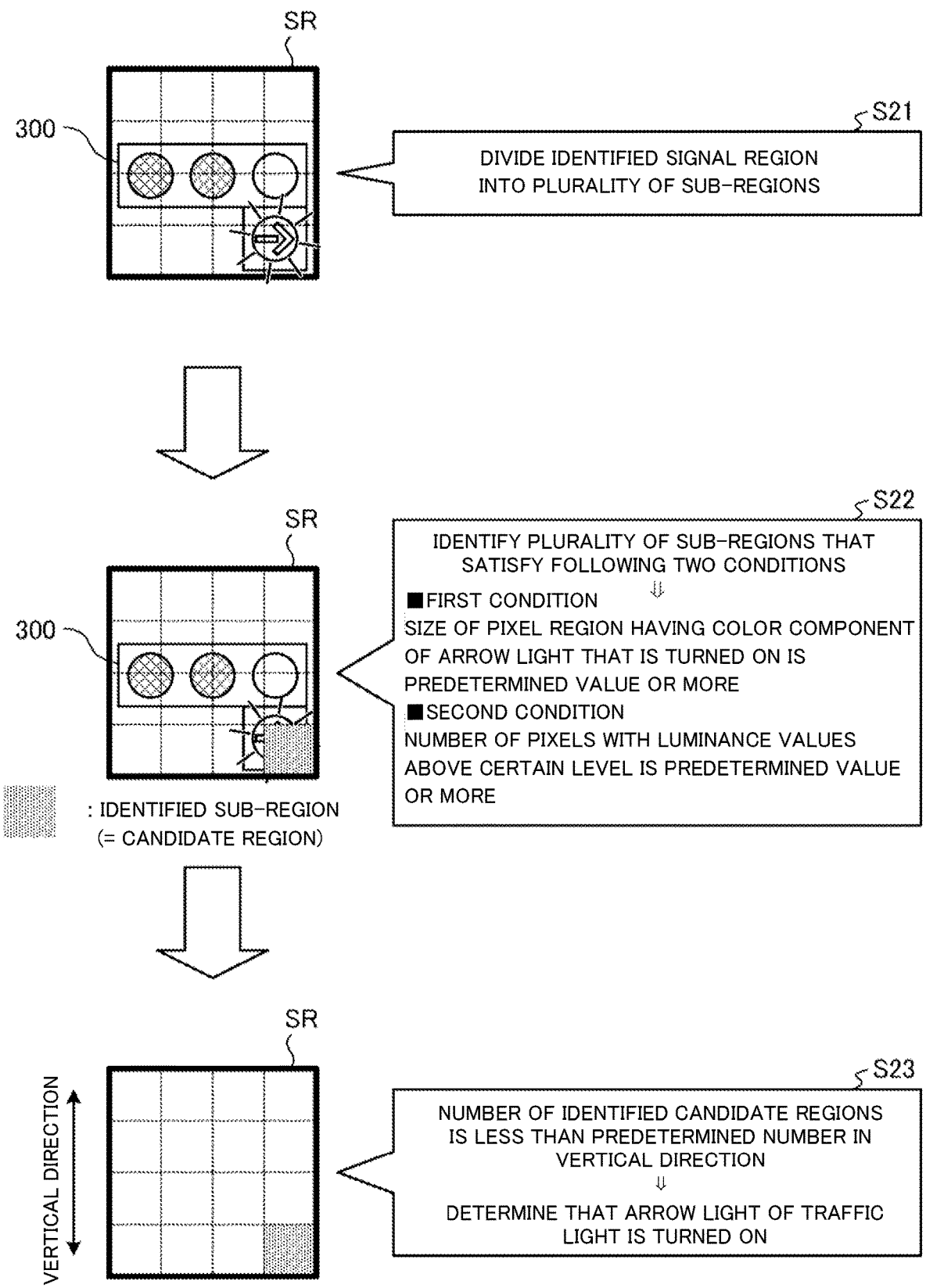
FIG. 3 is a schematic explanatory diagram (No. 2) of the image processing method according to the embodiment.

First, an outline of the image processing method according to the embodiment will be described with reference to FIG. 1 to FIG. 3. FIG. 1 is a schematic explanatory diagram (No. 1) of the image processing method according to the embodiment. FIG. 2 is an explanatory diagram in a case where a conventional arrow light is undetected or erroneously detected. FIG. 3 is a schematic explanatory diagram (No. 2) of the image processing method according to the embodiment.

The image processing apparatus 10 detects the lighting state of the traffic light 300, and for example, determines whether or not a driver of the vehicle is ignoring the traffic light based on the detection result. Such information processing is executed by a controller 12 (refer to FIG. 4) included in the image processing apparatus 10.

As illustrated in FIG. 1, the controller 12 inputs the camera image and identifies a rectangular region in which the traffic light 300 exists from the image. (a step S1). In the step S1, an existing image processing technology is applied. In the step S1, the controller 12 identifies the rectangular region in which the traffic light 300 exists from the image using a DNN (Deep Neural Network) model, etc., learned by using a machine learning algorithm. In the following, such a rectangular region is referred to as a "signal region SR".

Subsequently, the controller 12 inputs the signal region SR to determine the lighting state of the traffic light 300 (a step S2). In the step S2, the controller 12 analyzes the image of the signal region SR to determine whether the traffic light 300 is in a green lighting state, a yellow lighting state, or a red lighting state. In the red lighting state, the controller 12 further determines whether or not an arrow light of the traffic light 300 is turned on.

Next, the controller 12 performs motion estimation of estimating how the traffic light 300 moves relative to a traveling vehicle by a difference between frames of the camera image (a step S3). The controller 12 determines whether or not the driver of the vehicle is ignoring the traffic light based on a result of a lighting state determination in the step S2 and a result of the motion estimation in the step S3 (a step S4), and outputs the determination result.

The image processing method according to the embodiment is applied in the step S2 surrounded by a dashed rectangle. In the conventional technology, in a case where the arrow light of the traffic light 300 is detected in the step S2, the arrow light is detected based on a positional relationship with a red light.

However, when the conventional technology is used, the arrow light may be undetected although the arrow light is actually turned on, or the arrow light may be erroneously detected although the traffic light 300 does not include the arrow light.

Specifically, a case in which the arrow light is undetected is, as illustrated in a left drawing of FIG. 2, a case in which a center position RP of the red light is erroneously detected, for example, due to halation at night. In this case, if the controller 12 tries to detect the arrow light based on the positional relationship between the red light and arrow light, the arrow light does not exist in a region P1 in which the arrow light should exist relative to the center position RP, so that the controller 12 determines that the arrow light is undetected.

A case in which the arrow light is erroneously detected is, as illustrated in a right drawing of FIG. 2, for example, a case in which there is a background, such as a tree T, in the region P1 relative to the center position RP, although the center position RP of the red light has been normally detected. In this case, if the background happens to have a same color component as that of the arrow light, the controller 12 erroneously detects the arrow light.

Thus, in the image processing method according to the embodiment, when the controller 12 detects the arrow light in the step S2, the controller 12 identifies a candidate region that satisfies a first condition related to the color component of the arrow light and a second condition related to a luminance component of the arrow light from the signal region SR. When a size of the identified candidate region is smaller than a predetermined size, the controller 12 determines that the arrow light of the traffic light 300 is turned on.

Specifically, as illustrated in FIG. 3, in the image processing method according to the embodiment, the controller 12 divides the identified signal region SR into a plurality of sub-regions (a step S21). FIG. 3 shows an example in which the signal region SR is divided into 16 (=4×4) sub-regions. However, a number of divisions of the signal region SR is not limited thereto.

Subsequently, the controller 12 identifies the plurality of the sub-regions that satisfy the following two conditions (a step S22). The first condition as one of the two conditions is a condition related to the color component of the arrow light. Specifically, as illustrated in FIG. 3, the first condition is that a size of a pixel region having the color component of the arrow light that is turned on is a predetermined value or more.

The second condition as the other of the two conditions is a condition related to the luminance component of the arrow light. Specifically, as illustrated in FIG. 3, the second condition is that a number of pixels with luminance values above a certain level is the predetermined value or more. The controller 12 identifies the plurality of the sub-regions that satisfy both the first and second conditions as the candidate region.

In this way, the controller 12 divides the signal region SR into the plurality of the sub-regions and identifies the candidate region corresponding to the arrow light for each of the plurality of the sub-regions. Thus, it is possible to easily determine whether or not the arrow light is turned on by a number of the identified candidate regions.

When the number of the identified candidate regions is less than a predetermined number in a vertical direction, the controller 12 determines that the arrow light of the traffic light 300 is turned on (a step S23). The predetermined number is set to a value (e.g., three) such as a threshold value converted to the number of the plurality of the sub-regions at which a size of the candidate region that satisfies the conditions corresponding to the arrow light is considered to be too large. However, the predetermined number is not limited thereto, and an arbitrary value may be set.

Here, although an example in which the number of the identified candidate regions is determined has been described, the number of the identified candidate regions is converted to the size of the candidate region. That is, when the size of the identified candidate region is smaller than the predetermined size, the controller 12 determines that the arrow light of the traffic light 300 is turned on. This method of determining the size of the candidate region is used regardless of a presence or absence of the plurality of the sub-regions. Therefore, the signal region SR does not always have to be divided.

As illustrated in FIG. 3, in the image processing method according to the embodiment, when the controller 12 detects the arrow light in the step S2, the controller identifies the candidate region that satisfies the first condition related to the color component of the arrow light and the second condition related to the luminance component of the arrow light from the signal region SR. Then, when the size of the identified candidate region is smaller than the predetermined size, the controller 12 determines that the arrow light of the traffic light 300 is turned on.

As described above, since the controller 12 performs determination of the arrow light without depending on the positional relationship between the red light and the arrow light, it is possible to suppress a case of undetected or erroneous detection illustrated in FIG. 2. That is, according to the image processing method according to the embodiment, it is possible to improve a detection accuracy of the arrow light in the traffic light 300.

In the explanation of FIG. 3, although, in the step S23, the controller 12 determines the signal region SR in the vertical direction, this is because the traffic light 300 in the signal region SR is horizontally oriented. When the traffic light 300 in the signal region SR is vertically oriented, in the step S23, the controller 12 may determine the signal region SR in a horizontal direction.

When the traffic light 300 is vertically oriented, the controller 12 may rotate the signal region SR 90 degrees so that the traffic light 300 is regarded as being horizontally oriented. This point will be described later with reference to FIG. 10.

Hereinafter, a configuration example of the image processing apparatus 10 using the image processing method according to the embodiment will be more specifically described.

Figure 4:
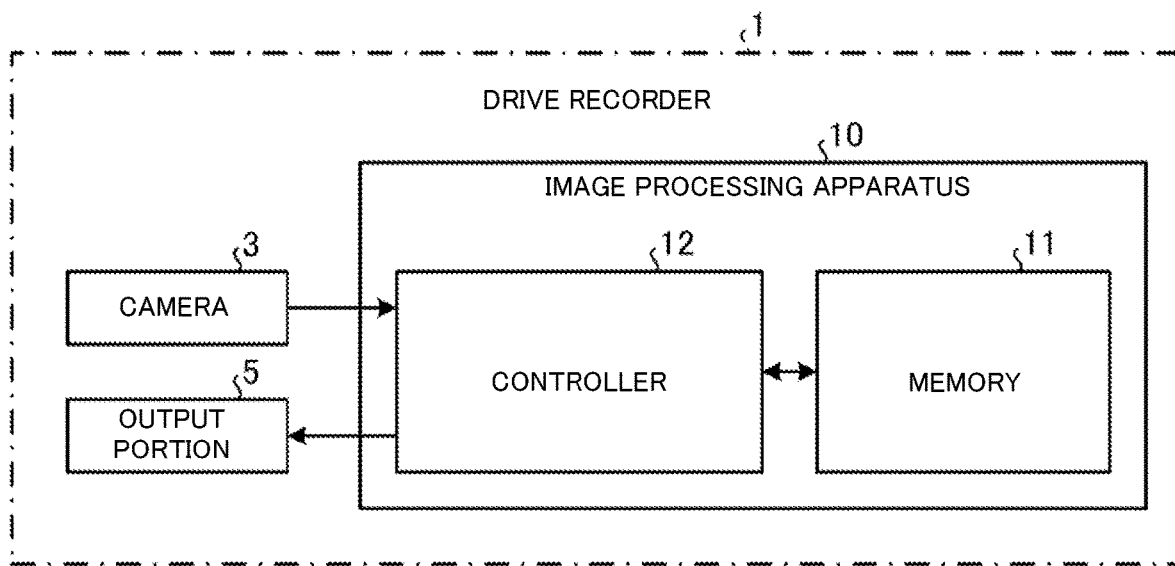
FIG. 4 illustrates a configuration example of an image processing apparatus according to the embodiment.

FIG. 4 illustrates the configuration example of the image processing apparatus 10 according to the embodiment. As illustrated in FIG. 4, the image processing apparatus 10 includes a memory 11 and the controller 12. A camera 3 and an output portion 5 are connected to the image processing apparatus 10.

The camera 3 is mounted in the vehicle and provided to capture an image in front of the vehicle. The camera 3 may be a 360-degree camera capable of capturing images not only in front of the vehicle but also all around the vehicle.

The output portion 5 is an output device that presents output information from the image processing apparatus 10. The output portion 5 is implemented by a display, a speaker, and the like.

The image processing apparatus 10 is, for example, a computer to be mounted in the vehicle. The image processing apparatus 10 performs an information processing of at least the steps S1 to S4 described with reference to FIG. 1 and the step S21 to S23 described with reference to FIG. 3.

The memory 11 is implemented by a storage device such as a RAM (Random Access Memory) or a flash memory. The memory 11 stores a computer program according to the embodiment executed by the controller 12. Furthermore, the memory 11 stores various information that is used in the information processing executed by the controller 12.

The memory 11 stores, for example, an AI (artificial Intelligence) model for the image recognition. The memory 11 stores various parameter information including the first and second conditions described above.

The controller 12 corresponds to a processor. The controller 12 is implemented by a CPU (Central Processing Unit), an MPU (Micro Processing Unit), a GPU (Graphics Processing Unit), or the like. The controller 12 reads and executes a computer program according to the embodiment stored in the memory 11 using the RAM as a work area. The controller 12 is also implemented by an integrated circuit such as an ASIC (Application Specific Integrated Circuit) or a FPGA (Field Programmable Gate Array).

Figure 6:
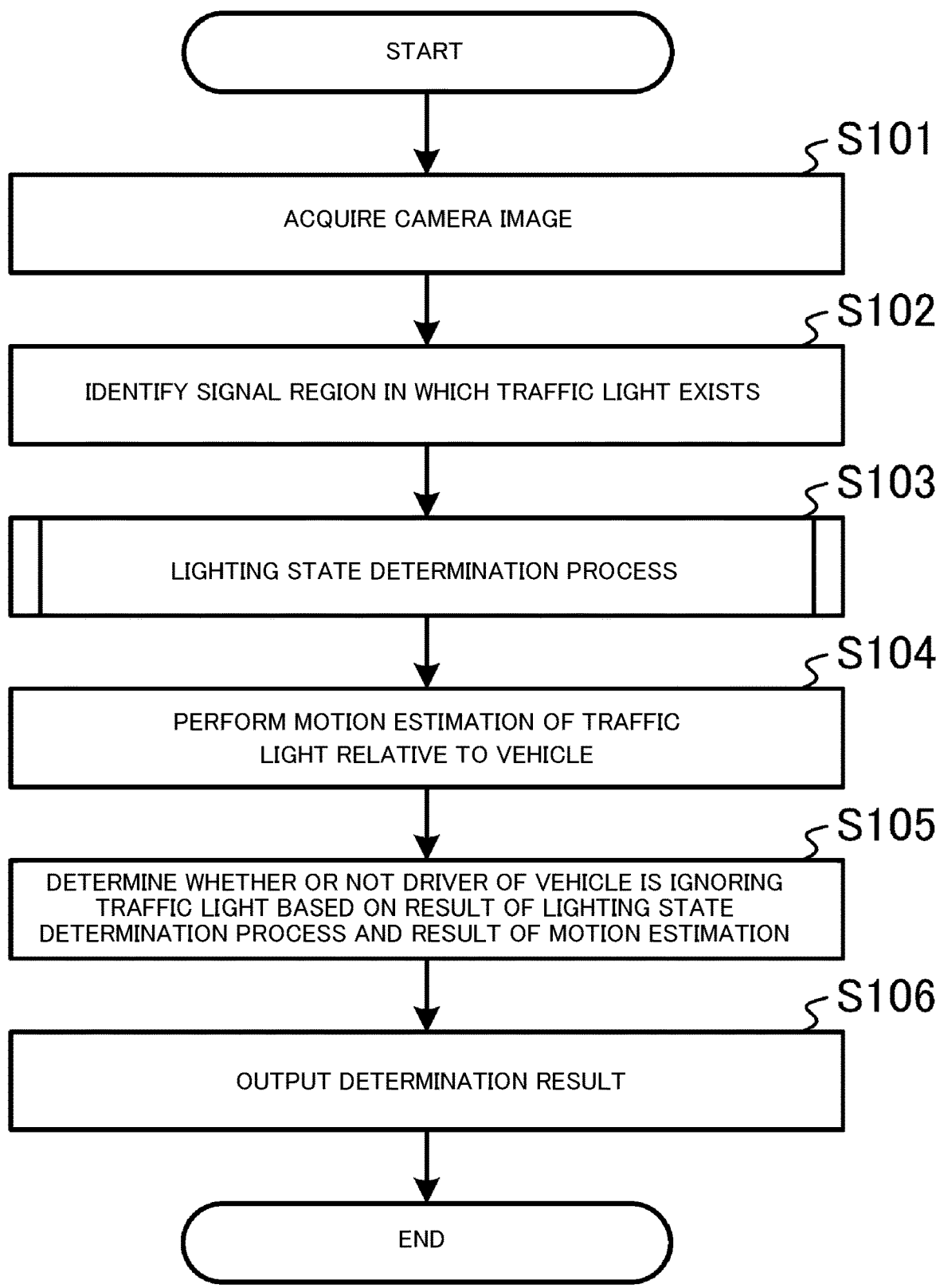
FIG. 6 is a flowchart (No. 1) illustrating a processing procedure executed by the image processing apparatus according to the embodiment.
Figure 7:
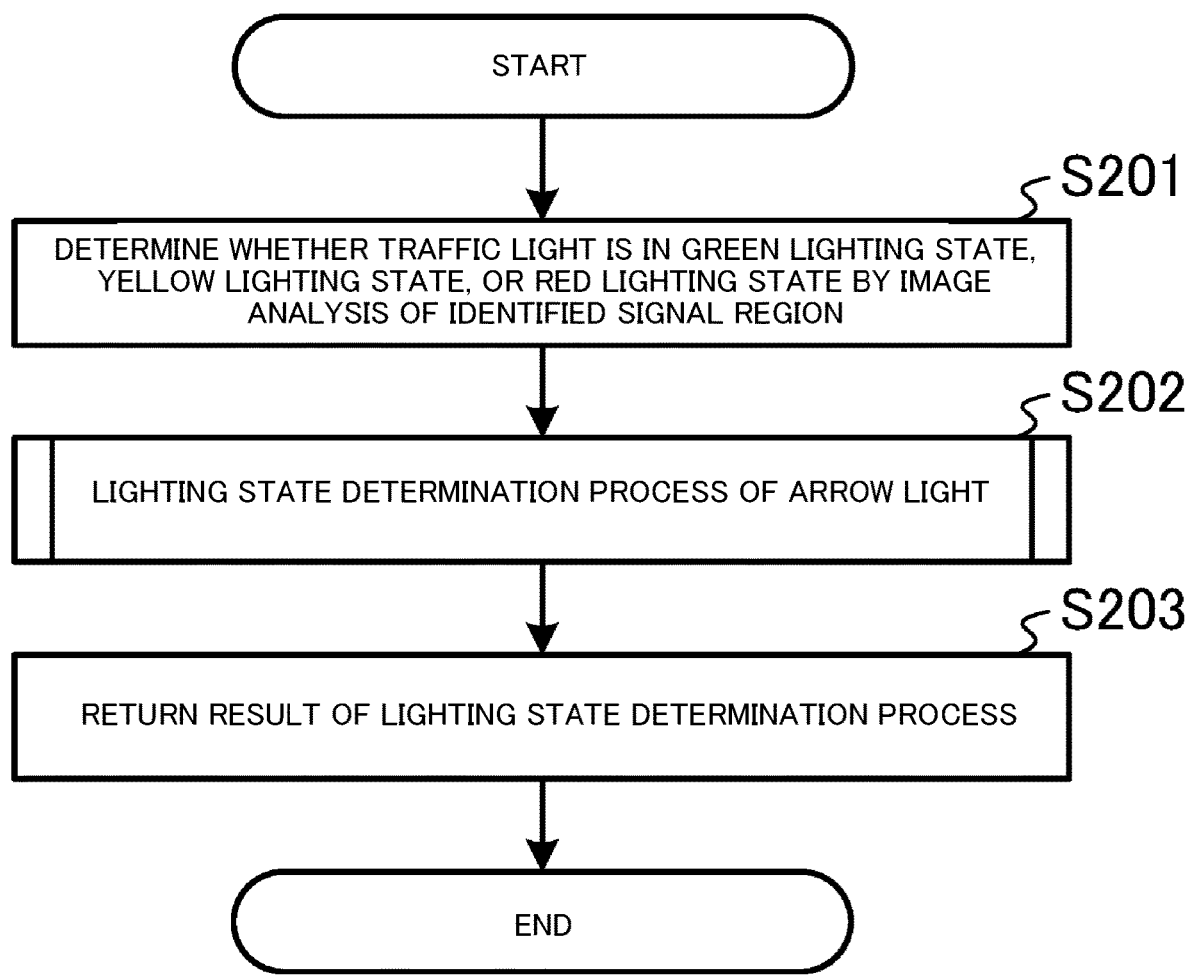
FIG. 7 is a flowchart (No. 2) illustrating a processing procedure executed by the image processing apparatus according to the embodiment.
Figure 8:
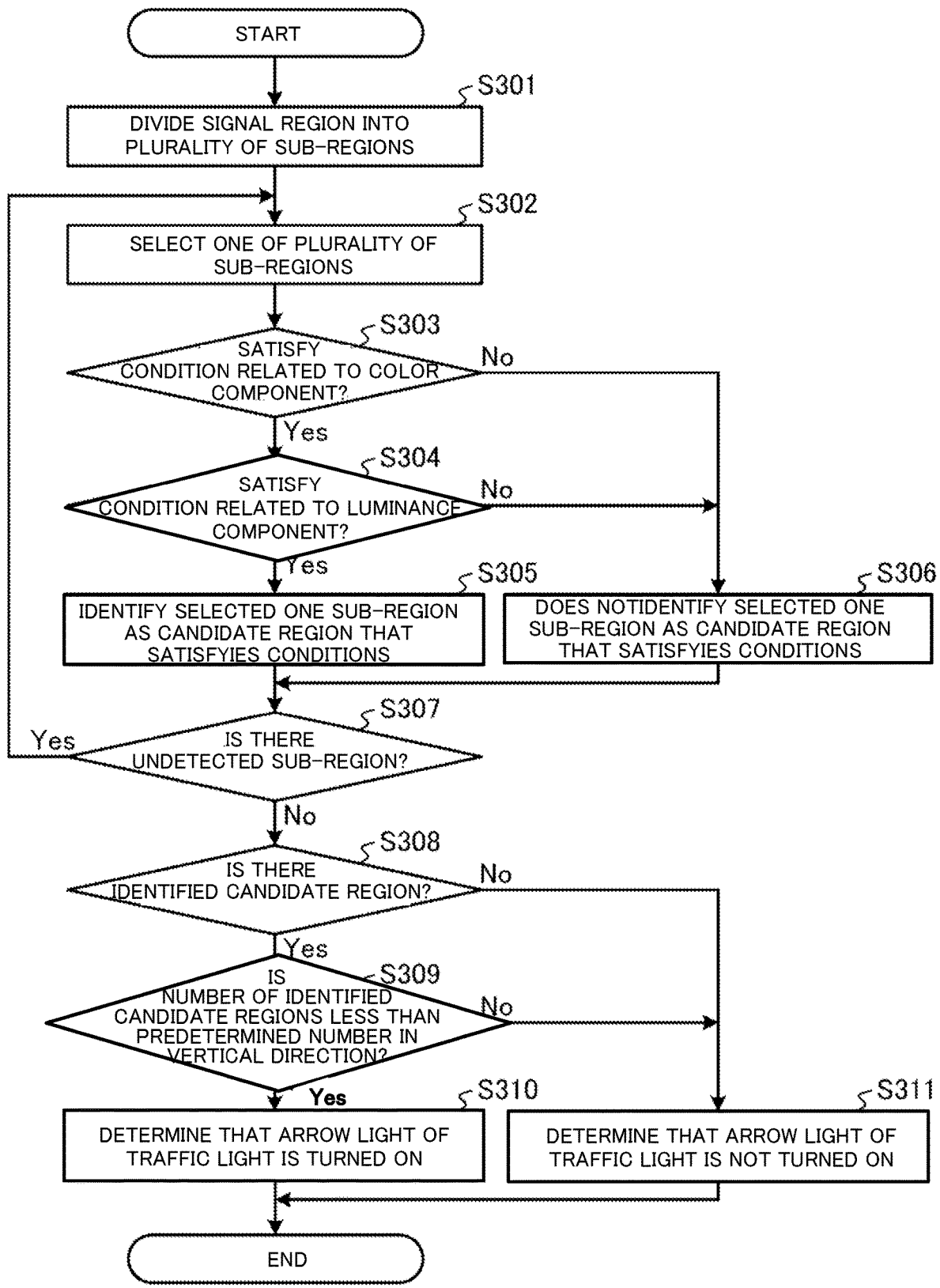
FIG. 8 is a flowchart (No. 3) illustrating a processing procedure executed by the image processing apparatus according to the embodiment.

The controller 12 performs the information processing according to the processing procedure illustrated in each flowchart of FIG. 6 to FIG. 8. An explanation with reference to FIG. 6 to FIG. 8 will be described later.

As illustrated in FIG. 4, the camera 3, the output portion 5 and the image processing apparatus 10 are implemented as a drive recorder 1. In this case, the camera 3 is implemented by a camera unit to be mounted in the drive recorder 1. The output portion 5 is implemented by a display and a speaker to be mounted in the drive recorder 1. The image processing apparatus 10 is implemented by a microcomputer to be mounted in the drive recorder 1.

Figure 5:
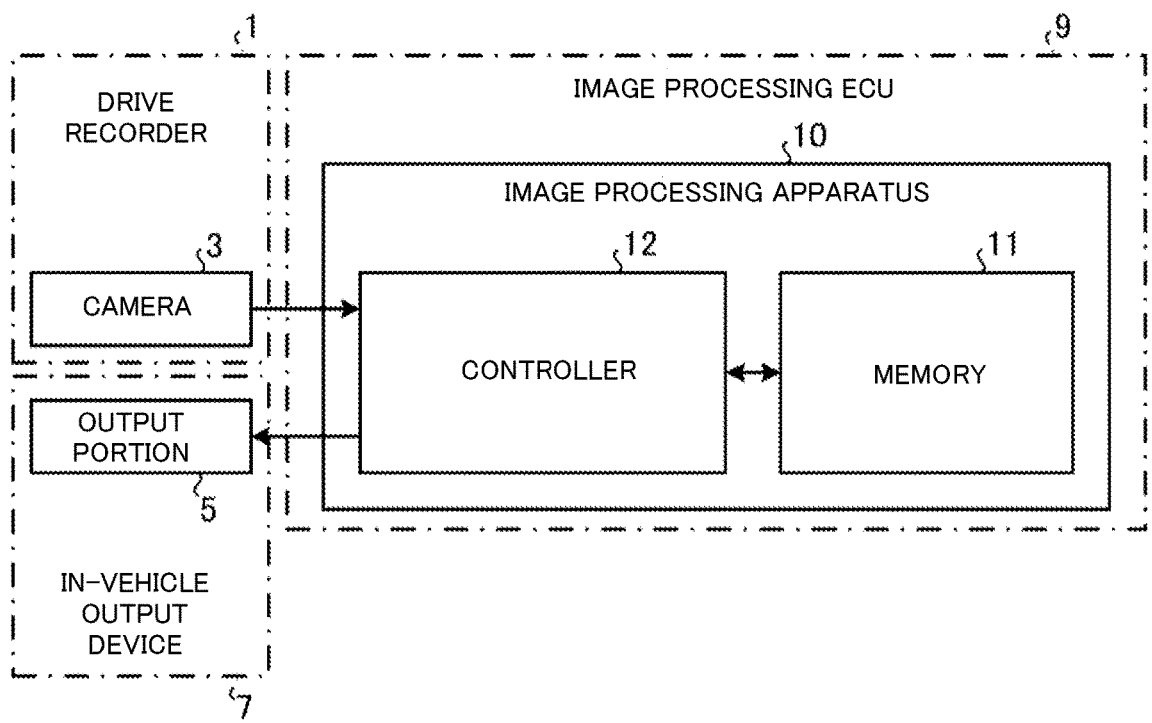
FIG. 5 illustrates a configuration example of an image processing apparatus according to an example modification.

The configuration example illustrated in FIG. 4 is one example, and besides this, a modification example will be given. FIG. 5 illustrates the configuration example of the image processing apparatus 10 according to an example modification. As illustrated in FIG. 5, the image processing apparatus 10 is implemented as an image processing ECU (Electronic Control Unit) 9. In this case, the camera 3 is, for example, implemented by the camera unit to be mounted in the drive recorder 1. The camera 3 may be implemented by an in-vehicle camera unit other than the drive recorder 1. The output portion 5 is implemented by an in-vehicle display and an in-vehicle speaker as an in-vehicle output device 7 to be mounted in the vehicle.

In the example of FIG. 5, the camera 3 and the output portion 5 are connected to the image processing apparatus 10 via an in-vehicle network, such as a CAN (Controller Area Network). The camera 3 and the output portion 5 may be connected to the image processing apparatus 10 via a Bluetooth (registered trademark), a Wi-Fi (registered trademark), a UWB (Ultra-Wide Band), or the like, by using a wireless network.

Next, a processing procedure of the information processing executed by the controller 12 of the image processing apparatus 10 will be described with reference to FIG. 6 and FIG. 8. FIG. 6 is a flowchart (No. 1) illustrating the processing procedure executed by the image processing apparatus 10 according to the embodiment. FIG. 7 is a flowchart (No. 2) illustrating the processing procedure executed by the image processing apparatus 10 according to the embodiment. FIG. 8 is a flowchart (No. 3) illustrating the processing procedure executed by the image processing apparatus 10 according to the embodiment.

In order to determine whether or not the driver of the vehicle is ignoring the traffic light as illustrated in FIG. 1, the controller 12 acquires the camera image from the camera 3 as illustrated in FIG. 6 (a step S101). Subsequently, the controller 12 identifies the signal region SR in which the traffic light 300 exists from the acquired camera image (a step S102).

Subsequently, the controller 12 performs a "lighting state determination process" that determines the lighting state of the traffic light 300 based on the identified signal region SR (a step S103).

In this "lighting state determination process", as illustrated in FIG. 7, the controller 12 determines whether the traffic light 300 is in the green lighting state, the yellow lighting state, or the red lighting state by image analysis of the identified signal region SR (a step S201).

In the step S201, the controller 12, for example, applies a color extraction filter that extracts green, yellow, and red components from the signal region SR. The controller 12 determines whether the traffic light 300 is in the green lighting state, the yellow lighting state, or the red lighting state, for example, based on a color corresponding to the color component with the highest amount out of the extracted color components.

Subsequently, the controller 12 performs a "lighting state determination process of the arrow light" (a step S202). Although the figure is omitted, the step S202 may be performed when the traffic light 300 has been determined to be in the red lighting state in the step S201.

In the "lighting state determination process of the arrow light", as illustrated in FIG. 8, the controller 12 divides the signal region SR into the plurality of the sub-regions (a step S301). The controller 12 divides the signal region SR into the plurality of the sub-regions each having a predetermined size.

Subsequently, the controller 12 selects one of the plurality of the sub-regions (a step S302). Then, the controller 12 determines whether or not the selected one sub-region satisfies the condition related to the color component (i.e., the above first condition) (a step S303).

When the selected one sub-region satisfies the condition related to the color component (Yes in the step S303), then, the controller 12 determines whether or not the selected one sub-region satisfies the condition related to the luminance component (i.e., the above second condition) (a step S304).

When the selected one sub-region satisfies the condition related to the luminance component (Yes in the step S304), the controller 12 identifies the selected one sub-region as the candidate region that satisfies the condition (a step S305).

On the other hand, when the selected one sub-region does not satisfy the condition related to the color component (No in the step S303) or does not satisfy the condition related to the luminance component (No in the step S304), the controller 12 does not identify the selected one sub-region as the candidate region that satisfies the conditions (a step S306).

The controller 12 determines whether or not there is an undetermined sub-region (a step S307). When there is the undetermined sub-region (Yes in the step S307), the controller 12 repeats the process from the step S302. When there is no undetermined small area (No in the step S307), the controller 12 determines whether or not there is an identified candidate region (a step S308).

When there is the identified candidate region (Yes in the step S308), the controller 12 determines whether or not the number of the identified candidate regions is less than the predetermined number in the vertical direction (a step S309). When the number of the identified candidate regions is less than the predetermined number (Yes in the step S309), the controller 12 determines that the arrow light of the traffic light 300 is turned on (a step S310).

When there is no identified candidate region (No in the step S308), or the number of the identified candidate regions is the predetermined number or more in the vertical direction (No in the step S309), the controller 12 determines that the arrow light of the traffic light 300 is not turned on (a step S311). Then, the controller 12 terminates the lighting state determination process of the arrow light.

Returning back to FIG. 7, when the controller 12 terminates the step S202, the controller 12 returns a result of the lighting state determination process (a step S203). The controller 12 terminates the lighting state determination process.

Returning back to FIG. 6, when the controller 12 terminates the step S103, the controller 12 performs the motion estimation of the traffic light 300 relative to the vehicle (a step S104). The controller 12 estimates how the traffic light 300 moves relative to the traveling vehicle, as described above, for example, by the difference between the frames of the camera image.

Subsequently, the controller 12 determines whether or not the driver of the vehicle is ignoring the traffic light based on the result of the lighting state determination process in the step S103 and the result of the motion estimation in the step S104 (a step S105). Then, the controller 12 outputs the determination result to the output portion 5 (a step S106), and terminates the process.

Although the figure is omitted, the controller 12 may output the determination result to the output portion 5 based on a stability of the determination result between the frames of the camera image. In one example, when the stability is considered to be high, such a case that the same determination result is consecutive between frames, the controller 12 may output the determination result to the output portion 5. As a result, it is possible to output the stable determination result that is hardly affected by disturbances.

Figure 9:
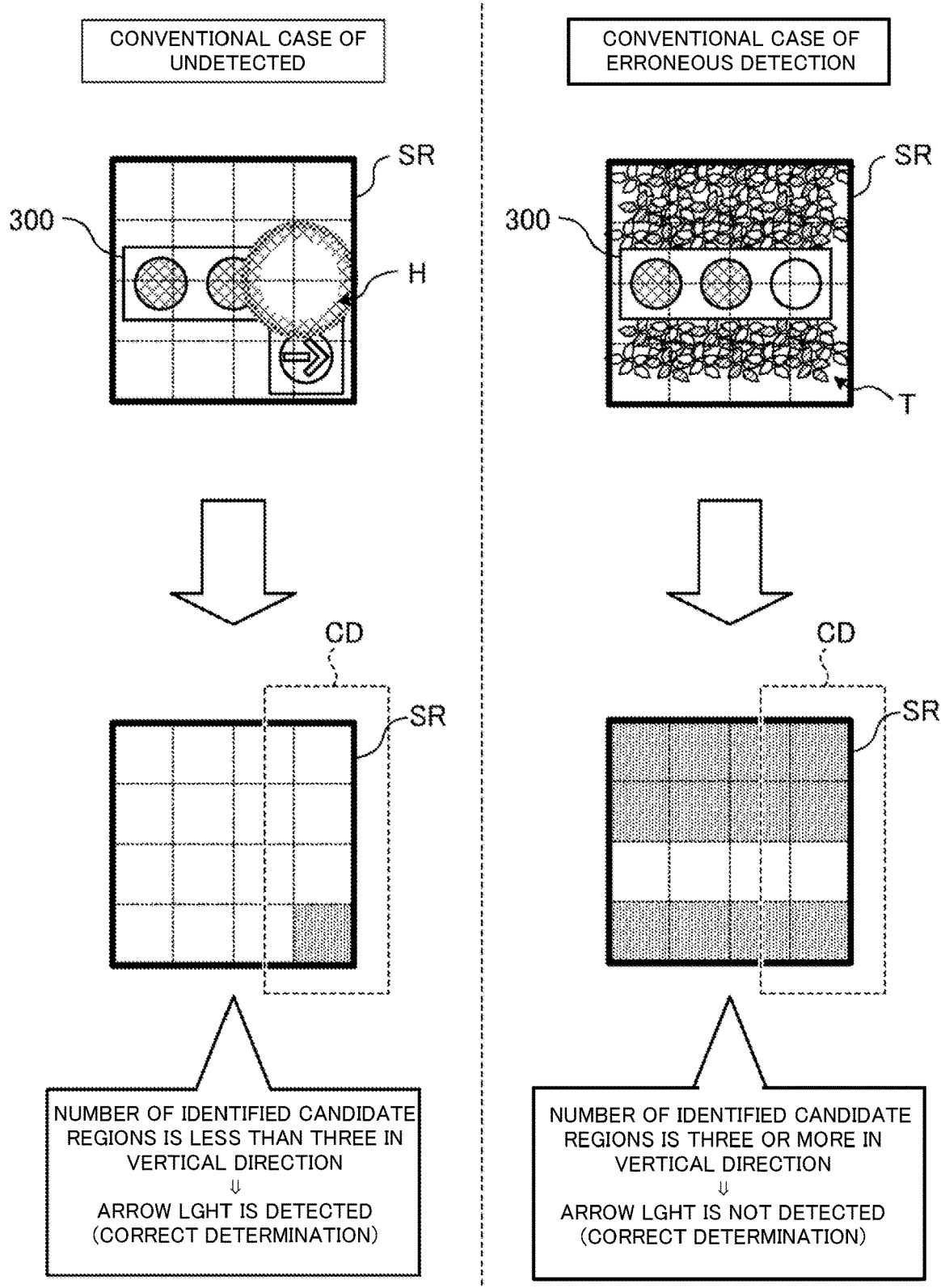
FIG. 9 is an explanatory diagram illustrating a conventional case of undetected or erroneous detection improved by the embodiment.

According to the image processing apparatus 10 according to the embodiment described above, the conventional case of undetected or erroneous detection described with reference to FIG. 2 is improved. FIG. 9 is an explanatory diagram illustrating the conventional case of undetected or erroneous detection improved by the embodiment.

In the explanation of FIG. 9, it is assumed that the predetermined number for determining the number of the identified candidate regions is three. As illustrated in a left drawing of FIG. 9, in the conventional case in which the arrow light is undetected, according to the embodiment, for example, even when there is halation H, if the first and the second conditions of the arrow light are satisfied, the candidate region of the arrow light is identified. When the number of the identified candidate regions is less than three in a vertical direction CD, the arrow light is detected. That is, according to the embodiment, even when there is the halation H, the arrow light is correctly determined.

On the other hand, as illustrated in a right drawing of FIG. 9, in the conventional case in which the arrow light is erroneously detected, according to the embodiment, for example, even when there is a tree T having the same color component as that of the arrow light, if the number of the identified candidate regions is three or more in the vertical direction CD, the arrow light is not detected. That is, according to the embodiment, it is possible to correctly determine that the background having the same color component as that of the arrow light is not the arrow light.

The right drawing of FIG. 9 illustrates the traffic light 300 without the arrow light. However, in a case where the traffic light 300 includes the arrow light, it is expected that the background having the same color component as that of the arrow light is reflected in the camera image.

In this case, in order to distinguish the color component of the arrow light from the color component corresponding to the background of the traffic light 300, such a countermeasure that the threshold value for distinguishing between both the color components is set for the above first condition is taken. As a result, when the traffic light 300 includes the arrow light, even when the background having the same color component as that of the arrow light is reflected in the camera image, it is possible to correctly determine the arrow light.

Furthermore, as illustrated in the right drawing of FIG. 9, when the background is the tree T, etc., the candidate regions are often consecutively identified in the vertical direction CD of the signal region SR. Therefore, when there are consecutive ones of the candidate regions in the vertical direction CD of the signal region SR, the controller 12 may determine that the arrow light of the traffic light 300 is not turned on without depending on the number of the candidate regions. As a result, the controller 12 correctly determines that the arrow light of the traffic light 300 is not turned on based on such a feature that the consecutive candidate regions are likely to be identified in a case where the background is the tree T, etc.

By the way, in the explanation of FIG. 9, an example in which, when the traffic light 300 in the signal region SR is horizontally oriented, the controller 12 determines the signal region SR in the vertical direction CD has been described. On the other hand, when the traffic light 300 in the signal region SR is vertically oriented, the controller 12 may determine the signal region SR in the horizontal direction. That is, the controller 12 determines the signal region SR in the same direction of either the vertical direction or the horizontal direction, depending on whether the traffic light 300 in the signal region SR is horizontally or vertically oriented. As a result, regardless of whether the traffic light 300 is horizontally or vertically oriented, it is possible to detect the arrow light in a similar determination method.

Figure 10:
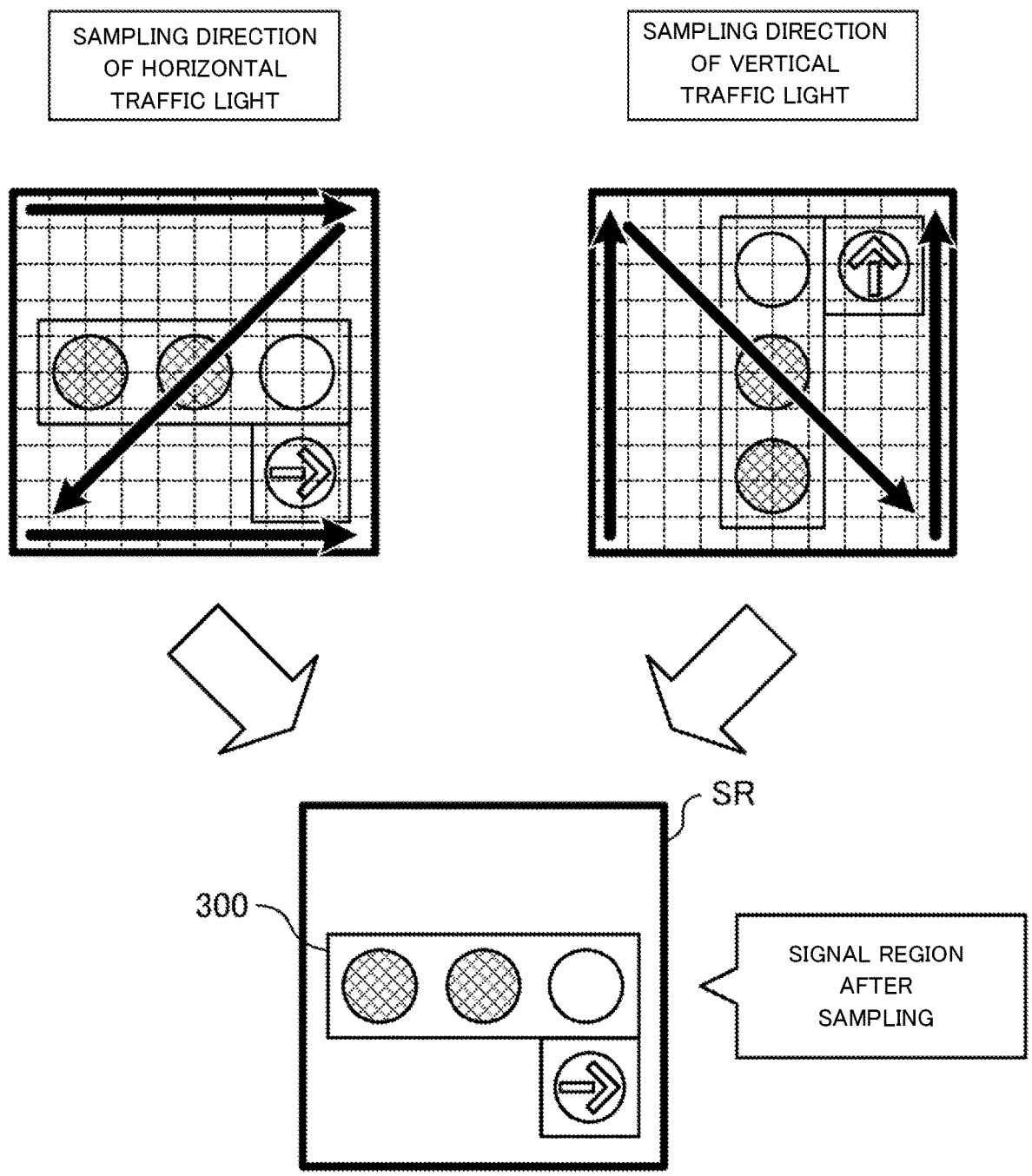
FIG. 10 is an explanatory diagram in a case where a signal region is rotated 90 degrees.

Furthermore, when the traffic light 300 is vertically oriented, the controller 12 may rotate the signal region SR 90 degrees so that the traffic light 300 is regarded as being horizontally oriented. FIG. 10 is an explanatory diagram in a case where the signal region SR is rotated 90 degrees.

The controller 12 samples images of the traffic light 300 having various sizes that are reflected in the camera image so that the images of the traffic light 300 always have the same size (e.g., 25×25 pixels) so as to identify the signal region SR.

For a sampling direction, as illustrated in FIG. 10, a horizontal traffic light is scanned from the top left to the bottom right and a vertical traffic light is scanned from the bottom left to the top right. That is, the controller 12 samples the images of the traffic light 300 in the sampling direction in which the pixels on the camera image are sequentially scanned along a longitudinal direction of the traffic light 300 in the camera image so as to identify the signal region SR. Thus, as illustrated in FIG. 10, the signal region SR after sampling is seen the same regardless of whether the traffic light 300 is horizontally or vertically oriented.

Therefore, for the traffic light 300 to be determined, the controller 12 treats the images of the traffic light 300 as image information that always has the same size and direction, regardless of the size of the traffic light 300 in the camera image and whether the traffic light 300 is horizontally or vertically oriented. In this case, the controller 12 determines the identified candidate region always in the vertical direction CD.

As described above, the image processing apparatus 10 according to the embodiment has the controller 12. The controller 12 performs image recognition of the camera image to identify the signal region SR in which the traffic light 300 exists in the camera image. The controller 12 identifies the candidate region that satisfies the first condition related to the color component of the arrow light and the second condition related to the luminance component of the arrow light from the signal region SR. When the size of the identified candidate region is smaller than the predetermined size, the controller 12 determines that the arrow light of the traffic light 300 is turned on. As a result, it is possible to prevent the arrow light from being undetected although the arrow light is actually turned on or to prevent the arrow light from being erroneously detected in a case where the traffic light 300 does not include the arrow light. That is, according to the image processing apparatus 10 according to the embodiment, it is possible to improve the detection accuracy of the arrow light in the traffic light 300.

In the embodiment described above, although the lighting state determination and motion estimation of the traffic light 300 and determination of whether or not the driver of the vehicle is ignoring the traffic light are performed based on the image recognition, sensor data of various sensors mounted in the vehicle may be naturally combined with the image recognition. For example, a behavior of the vehicle may be estimated by using a sensor value of a steering sensor or an acceleration sensor. An own vehicle speed may be acquired by using a sensor value of a speed sensor.

In the embodiment described above, although the signal region SR is a rectangular region, the signal region SR does not have to be a rectangular region.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus comprising a controller configured to:
   (i) perform image recognition of a camera image to identify a signal region in which a traffic light exists in the camera image, the traffic light including an arrow light;
   (ii) identify a candidate region of the signal region, the candidate region satisfying (a) a first condition related to a color component of the arrow light and (b) a second condition related to a luminance component of the arrow light; and
   (iii) determine that the arrow light of the traffic light is turned on when a size of the candidate region that has been identified is smaller than a predetermined size.

2. The image processing apparatus according to claim 1, wherein
   (1) the signal region is a rectangular region, (2) the rectangular region is divided into a plurality of sub-regions, (3) a determination is made as to whether the first and second conditions are satisfied for each of the plurality of sub-regions, and (4) when one or more of the plurality of sub-regions satisfy the first and second conditions, the one or more of the sub-regions are identified as the candidate regions.

3. The image processing apparatus according to claim 2, wherein
   when a number of the candidate regions that have been identified is less than a predetermined number in a same direction as a longer direction of the rectangular region, it is determined that the arrow light of the traffic light is turned on.

4. The image processing apparatus according to claim 2, wherein
   when there are consecutive ones of the candidate regions arranged in a same direction as a longer direction of the rectangular region, it is determined that the arrow light of the traffic light is not turned on.

5. The image processing apparatus according to claim 3, wherein
   when the traffic light is vertically oriented, the signal region is rotated 90 degrees so that the traffic light is regarded as being horizontally oriented.

6. The image processing apparatus according to claim 5, wherein
   when the number of the candidate regions that have been identified is less than the predetermined number in a vertical direction of the rectangular region, it is determined that the arrow light of the traffic light is turned on.

7. The image processing apparatus according to claim 1, wherein
   the candidate region is identified based on the first condition provided to distinguish the color component of the arrow light from a color component corresponding to a background of the traffic light.

8. The image processing apparatus according to claim 1, wherein
   a determination result of a lighting state of the traffic light is output based on a stability of the determination result between frames of the camera image.

9. The image processing apparatus according to claim 1, wherein
   the image processing apparatus is mounted in a drive recorder.

10. An image processing method executed by an image processing apparatus, the method comprising the steps of:

(a) performing image recognition of a camera image to identify a signal region in which a traffic light exists in the camera image, the traffic light including an arrow light;
(b) identifying a candidate region of the signal region, the candidate region satisfying (i) a first condition related to a color component of the arrow light and (ii) a second condition related to a luminance component of the arrow light; and
(c) determining that the arrow light of the traffic light is turned on when a size of the candidate region that has been identified is smaller than a predetermined size.

11. The image processing method according to claim 10, the method further comprising the steps of:
(d) identifying the signal region as a rectangular region;
(e) dividing the rectangular region into a plurality of sub-regions;
(f) determining whether the first and second conditions are satisfied for each of the plurality of sub-regions; and
(g) when one or more of the plurality of sub-regions satisfy the first and second conditions, identifying the one or more sub-regions as the candidate regions.

12. A non-transitory computer-readable recording medium having stored therein a program that causes a computer of an image processing apparatus to execute a process, the process comprising:
(i) performing image recognition of a camera image to identify a signal region in which a traffic light exists in the camera image, the traffic light including an arrow light;
(ii) identifying a candidate region of the signal region, the candidate region satisfying (a) a first condition related to a color component of the arrow light and (b) a second condition related to a luminance component of the arrow light; and
(iii) determining that the arrow light of the traffic light is turned on when a size of the candidate region that has been identified is smaller than a predetermined size.

13. The non-transitory computer-readable recording medium according to claim 12, the process further comprising:
(iv) identifying the signal region as a rectangular region;
(v) dividing the rectangular region into a plurality of sub-regions;
(vi) determining whether the first and second conditions are satisfied for each of the plurality of sub-regions; and
(vii) when one or more of the plurality of sub-regions satisfy the first and second conditions, identifying the one or more sub-regions as the candidate regions.

* * * * *